United States Patent
Watanabe et al.

(10) Patent No.: US 12,480,921 B2
(45) Date of Patent: Nov. 25, 2025

(54) TEST SOIL, METHOD FOR CLEANING OBJECT, AND METHOD FOR CONTROLLING ACCURACY OF CLEANING OPERATION

(71) Applicant: SYSMEX CORPORATION, Kobe (JP)

(72) Inventors: Shunsuke Watanabe, Kobe (JP); Kazuya Matsumoto, Kobe (JP); Kanako Sakaeda, Kobe (JP)

(73) Assignee: SYSMEX CORPORATION, Kobe (JP)

(*) Notice: Subject to any disclaimer, the term of this patent is extended or adjusted under 35 U.S.C. 154(b) by 535 days.

(21) Appl. No.: 18/158,141

(22) Filed: Jan. 23, 2023

(65) Prior Publication Data

US 2023/0304978 A1  Sep. 28, 2023

(30) Foreign Application Priority Data

Jan. 28, 2022 (JP) .................. 2022-012076

(51) Int. Cl.
| | | |
|---|---|---|
| G01N 33/00 | (2006.01) | |
| A61B 90/70 | (2016.01) | |
| G01N 31/22 | (2006.01) | |
| G01N 33/52 | (2006.01) | |

(52) U.S. Cl.
CPC ........... G01N 31/226 (2013.01); A61B 90/70 (2016.02); G01N 33/52 (2013.01); A61B 2090/702 (2016.02)

(58) Field of Classification Search
CPC .... G01N 31/226; G01N 33/52; G01N 33/532; G01N 33/533; G01N 33/583; G01N 33/582; G01N 21/78; G01N 36/68; A61B 90/70; A61B 2090/702; A61B 90/80
USPC .......................................................... 510/114
See application file for complete search history.

(56) References Cited

U.S. PATENT DOCUMENTS 5,719,031 A    2/1998 Haugland et al.
2017/0328875 A1* 11/2017 Christensen ....... G01N 33/6839

FOREIGN PATENT DOCUMENTS

| CN | 102408479 B | 2/2013 |
|---|---|---|
| DE | 202007017612 U1 | 3/2008 |
| JP | 61-164158 A | 7/1986 |
| JP | 61-291516 A | 12/1986 |
| JP | 2009-56030 A | 3/2009 |
| JP | 2009-75084 A | 4/2009 |
| JP | 5091589 B2 | 12/2012 |

(Continued)

OTHER PUBLICATIONS

"Erthrosin B—certified by the Biological Stain Commission, Dye content _85%" Sigma-Aldrich, Product No. 198269, pp. 1 (1 page total).

(Continued)

*Primary Examiner* — Eisa B Elhilo
(74) *Attorney, Agent, or Firm* — Sughrue Mion, PLLC

(57) ABSTRACT

Disclosed is a test soil comprising a plurality of molecules of labeled polypeptides, wherein the labeled polypeptide is a polypeptide to which a dye is added by a covalent bond, and the value of X calculated by the following formula is 100,000 or more:

$X$=(Number of Dyes Comprised in One Molecule of Labeled Polypeptide)×(Molar absorption coefficient of dye ($M^{-1}$ $cm^{-1}$))

10 Claims, 4 Drawing Sheets

(56) References Cited

FOREIGN PATENT DOCUMENTS

WO 2006/119251 A2 11/2006
WO WO 2016096952 A1 * 6/2016 .............. G01N 1/30

OTHER PUBLICATIONS

"Erthrosin B—Dye content _95%" Sigma-Aldrich, Product No. 200964, pp. 1 (1 page total).
Zhihuan Xu et al., "A sensitive competitive enzyme immunoassay for detection of erythrosine in foodstuffs", Food Control, 2015, vol. 47. pp. 472-477 (6 pages total).
Communication dated Jul. 24, 2024, from the European Patent Office in European Application No. 23 153 575.8.
Denisio M. Togashi et al., "Assessing protein-surface interactions with a series of multi-labeled BSA using fluorescence lifetime microscopy and Förster Energy Resonance Transfer", Biophysical Chemistry, Nov. 2010, pp. 55-64, vol. 152, Issues 1-3, Elsevier B.V.
Bianca K. Höfelschweiger, "The Pyrylium Dyes: A New Class of Biolabels. Synthesis, Spectroscopy, and Application as Labels and in General Protein Assay", Dissertation for the attainment of the doctoral degree in natural sciences of the Faculty of Chemistry and Pharmacy of the University of Regensburg, Jun. 2005, pp. 1-136 (144 pages in total), Regensburg.
J. Edward Valeski et al., "A characteristic cutaneous direct immunofluorescent pattern associated with Ro(SS-A) antibodies in subacute cutaneous lupus erythematosus", Journal of the American Academy of Dermatology, Aug. 1992, pp. 194-198, vol. 27, Issue 2, Part 1, Mosby Inc.
Igor D. Luzhansky et al., "In vivo near-infrared fluorescent fibrin highlights growth of nerve during regeneration across a nerve gap", Journal of Biomedical Optics, Jul. 2022, pp. 070502 (8 pages in total), vol. 27, No. 7, SPIE.
Meiling Yan et al., "A bimodal probe for fluorescence and synchrotron X-ray fluorescence imaging of dopaminergic neurons in the brain", Chemical Communitations, Jan. 2022, pp. 713-715, vol. 58, No. 5, The Royal Society of Chemistry.
Yuanfei Wang et al., "Transport of epidermal growth factor in the stroke-injured brain", Journal of Controlled Release, Oct. 2010, pp. 225-235, vol. 149, No. 3, Elsevier B.V.
The extended European search report issued on May 15, 2023 in a counterpart European patent application No. 23153575.8.
ISO/TS 15883-5, "Washer-disinfectors—Part 5: Test soils and methods for demonstrating cleaning efficacy", International Organization for Standardization (ISO), First edition, Nov. 15, 2005, 80 pages.
"Cleaning Evaluation Judgment Guideline", Japanese Society of Medical Instrumentation, Antibacterial Technician Accreditation Committee, WG to study and develop guidelines for cleaning evaluation decisions, Aug. 2012, pp. 1-15.

* cited by examiner

BEFORE CLEANING | AFTER CLEANING WITH WATER (WITHOUT DETERGENT) | AFTER CLEANING WITH DETERGENT

TEST SOIL, METHOD FOR CLEANING OBJECT, AND METHOD FOR CONTROLLING ACCURACY OF CLEANING OPERATION

CROSS REFERENCE TO RELATED APPLICATIONS

This application claims priority from prior Japanese Patent Application No. 2022-012076, filed on Jan. 28, 2022, entitled "Test soil, method for cleaning object, and method for controlling accuracy of cleaning operation", the entire contents of which are incorporated herein by reference.

FIELD OF THE INVENTION

The present invention relates to a test soil. The present invention relates to a method for cleaning an object. The present invention relates to a method for controlling accuracy of cleaning operation.

BACKGROUND

A body fluid or a tissue piece attaches to a medical instrument used for surgery or examination, such as a surgical knife, forceps, or an endoscope. In order to make the medical instrument used reusable, it is necessary to thoroughly clean and remove these contaminants that have attached. It is also important to evaluate whether or not the cleaning operation is appropriately performed. The evaluation method includes a direct method and an indirect method. As a direct evaluation method, for example, a method is known in which sheep blood is applied to a medical instrument as a test soil (also referred to as a pseudo-contaminant), then the medical instrument is cleaned, and a protein remaining in the cleaned medical instrument is detected. The protein is detected by, for example, coloring the protein remaining in the cleaned medical instrument using a dye capable of staining the protein such as amide black 10B and visually confirming the protein.

As an indirect evaluation method, a method of cleaning an indicator including a layer of a test soil together with a medical instrument to evaluate whether cleaning has been appropriately performed is known. For example, Japanese Laid-Open Patent Publication No. 2009-056030 describes an indicator using a mixture of gluten and Red No. 102 (also referred to as new coccine) as a test soil. The indicator is mainly used for evaluation of cleaning by an automatic cleaning device called a washer disinfector (WD).

SUMMARY OF THE INVENTION

The scope of the present invention is defined solely by the appended claims, and is not affected to any degree by the statements within this summary.

In the direct evaluation method, most of the test soils attached to the medical instrument are removed by cleaning, and thus it is difficult to visually detect the remaining test soil. Therefore, a dye solution is applied or sprayed to the cleaned medical instrument, but re-cleaning is required to reuse the medical instrument. The indirect evaluation method is intended to check performance and operation of the WD by an indicator disposed in the WD. Therefore, it is difficult to evaluate whether or not contaminant remains in the cleaned medical instrument itself by the indicator.

So far, no test soil is known which can be attached directly to an object to be cleaned and is visually detectable. An object of the present invention is to provide such a test soil, and a means for cleaning an object using the test soil, and a means for controlling accuracy of cleaning operation.

The present invention provides a test soil comprising a plurality of molecules of labeled polypeptides, wherein the labeled polypeptide is a polypeptide to which a dye is added by a covalent bond, and the value of X calculated by the following formula is 100,000 or more: X=(Number of dyes comprised in one molecule of labeled polypeptide)×(Molar absorption coefficient of dye ($M^{-1}$ $cm^{-1}$)).

The invention provides a method for cleaning an object, the method comprising: attaching the test soil; and cleaning the object to which the test soil is attached.

The invention provides a method for controlling accuracy of cleaning, the method comprising: attaching the test soil to an object; cleaning the object to which the test soil is attached; evaluating the test soil remaining on the cleaned object based on the dye; and determining whether or not the cleaning was appropriate based on the evaluation result.

The invention provides a method for controlling accuracy of cleaning, the method comprising: attaching the test soil to a first object; cleaning the first object to which the test soil is attached and a second object to which a biologically derived contaminant is attached; evaluating the test soil remaining on the cleaned first object based on the dye; and determining whether or not the cleaning on the second object was appropriate based on the evaluation result.

According to the present invention, it is possible to visually evaluate whether or not the cleaning operation on the object was appropriate.

DETAILED DESCRIPTION OF THE PREFERRED EMBODIMENTS

Figure 1:
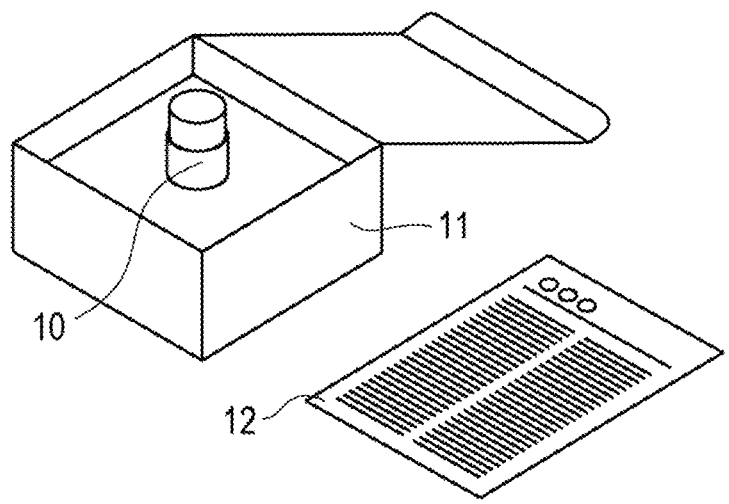
FIG. 1 is a schematic view showing an example of a test soil of the present embodiment stored in a container.

The test soil of the present embodiment is a composition containing a plurality of molecules of labeled polypeptides. The number of molecules of the labeled polypeptide contained in the test soil of the present embodiment is not particularly limited as long as it is two or more molecules. The test soil of the present embodiment is a composition artificially prepared to simulate a contaminant containing a polypeptide as a main component.

The labeled polypeptide contained in the test soil of the present embodiment is a polypeptide to which a dye is artificially added. In the labeled polypeptide, the dye and the polypeptide are covalently bonded. Therefore, it is considered that the dye is not desorbed from the labeled polypeptide by cleaning usually performed on an object. That is, decolorization of the test soil of the present embodiment in a state of being attached to the object hardly occurs. Therefore, whether or not the object was sufficiently cleaned can be evaluated by detecting the dye of the labeled polypeptide contained in the test soil in the cleaned object.

The amino acid sequence, molecular weight, solubility in a solvent, and the like of the polypeptide are not particularly limited, and can be arbitrarily selected. The polypeptide is preferably a polypeptide having a molecular weight of 20,000 or more. The polypeptide may be, for example, a polypeptide assumed to be attached to an object to be cleaned. As such a polypeptide, a protein contained in a body fluid or tissue of a mammal is preferable. Examples of such proteins include albumin, casein, fibrin, globulin, hemoglobin, and the like. Among them, albumin and casein are preferable. The type of albumin is not particularly limited, and examples thereof include serum albumin, ovalbumin, lactalbumin, leucocin, legumelin, lysine, and the like. The type of casein is not particularly limited, and examples thereof include acid casein, sodium caseinate, $\alpha_s$-casein, $\beta$-casein, $\kappa$-casein, and the like.

The dye is not particularly limited, and may be a natural dye or a synthetic dye. Examples of the dye include a dye exhibiting a visible color, a dye generating a detectable signal, and the like. The dye exhibiting a visible color is a dye that absorbs and reflects visible light having a predetermined wavelength under white light to be colored. Examples thereof include erythrosine (also referred to as erythrosine B), furoxin, rose bengal, tartrazine, amaranth, new coccine, allura red AC, acid red, and the like. Examples of the dye that generates a detectable signal include fluorescent dyes. The labeled polypeptide having a fluorescent dye can be visually recognized by irradiation with excitation light, for example, irradiation with black light (for example, UV-A having a wavelength of about 315 nm or more and about 380 nm or less). Examples of the fluorescent dye include fluorescein dyes, cyanine dyes, rhodamine, acridine orange, Alexa Fluor (registered trademark), and the like. The fluorescein dye refers to fluorescein and a derivative thereof. Examples of the derivative of fluorescein include fluorescein isothiocyanate, carboxyfluorescein, carboxyfluorescein diacetate, Oregon green, phosphafluorescein, and the like. The cyanine dye refers to a dye having a structure having nitrogen-containing heterocyclic rings at both ends of a polymethine skeleton. Examples of the cyanine dye include Cy (registered trademark) 3, Cy5, Cy7, TOTO (trademark)-1, TOTO-3, TO-PRO (trademark)-1, TO-PRO-3, DiOC6 (3), and the like.

The dye in the labeled polypeptide is preferably a red dye from the viewpoint of visibility. Here, the red refers to a color that can be visually recognized by an observer when observed under white light, as the dye absorbs visible light having a wavelength other than red and reflects red visible light (light with a wavelength of about 610 nm or more and about 780 nm or less). Examples of the red dye include erythrosine, furoxin, rose bengal, and the like. The erythrosine is particularly preferable among them.

The present inventors considered that the visibility of the labeled polypeptide correlates with the number of dyes (hereinafter, also referred to as "the number of labels") of one molecule of the labeled polypeptide and the molar absorption coefficient, which is a value unique to the dye molecule. Therefore, the value of X calculated by the following formula (I) was defined as an index representing the intensity of the label by the labeled polypeptide. Hereinafter, the value of X is also referred to as "color tone index" or "CTI".

$X$=(Number of dyes comprised in one molecule of labeled polypeptide)×(Molar absorption coefficient of dye ($M^{-1}$ $cm^{-1}$)) \hfill (I)

The labeled polypeptide is characterized in that the value of X calculated by the formula (I) is 100,000 or more. When the value of X is 100,000 or more, even a trace amount of labeled polypeptide can be visually detected. The higher the value of X, the more strongly the labeled polypeptide is colored. For example, in the labeled polypeptide, the value of X is preferably 350,000 or more, and more preferably 1,000,000 or more.

The number of labels is determined by mass spectrometry or measurement of dye concentration and polypeptide concentration of a labeled polypeptide solution. The mass spectrometry is a MALDI-TOF MS method in which a labeled polypeptide is ionized by a matrix-assisted laser desorption ionization (MALDI) method and analyzed with a time-of-flight (TOF) mass spectrometer. The MALDI-TOF MS method is known per se. When the labeled polypeptide can be analyzed by the MALDI-TOF MS method, the number of labels is determined by the method. Only when the labeled polypeptide cannot be analyzed by the MALDI-TOF MS method, the number of labels is determined by measuring the dye concentration and polypeptide concentration of the labeled polypeptide solution. Whether or not the labeled polypeptide can be analyzed by the MALDI-TOF MS method depends on the type of polypeptide in the labeled polypeptide.

Determination of the number of labels by the MALDI-TOF MS method is performed by calculating the number of labels from the following formula (II) using the mass of the labeled polypeptide obtained by the MALDI-TOF MS method, the mass of the polypeptide in the labeled polypeptide, and the molecular weight of the dye. The mass of the polypeptide may be measured by the MALDI-TOF MS method as with the labeled polypeptide. Alternatively, a mass value disclosed by a manufacturer or seller of the polypeptide may be used. The molecular weight of the dye may be calculated from the structural formula of the dye, or a molecular weight disclosed by a manufacturer or seller of the dye may be used.

(Number of labels)=[(Mass of labeled polypeptide)−(Mass of polypeptide)]/(Molecular weight of dye) \hfill (II)

Determination of the number of labels by the measurement of the dye concentration and polypeptide concentration of the labeled polypeptide solution is performed by calculating the number of labels from the following formula (III) using the dye concentration and polypeptide concentration of the labeled polypeptide solution determined by the measurement. As the "concentration" in the formula (III), for example, a molar concentration, a mass concentration, a volume percent concentration, or the like is used.

(Number of labels)=(Dye concentration of labeled polypeptide solution)/(Polypeptide concentration of labeled polypeptide solution) \hfill (III)

The dye concentration of the labeled polypeptide solution is measured as follows. First, a calibration curve based on the dye concentration of the dye solution and the absorbance thereof is created. Specifically, first, solutions containing the dye itself at various concentrations are prepared, and absorbance of each solution at a wavelength (for example, maximum absorption wavelength) at which the dye can be measured is measured. The absorbance can be measured using a known spectrophotometer. Then, absorbance corresponding to each dye concentration is plotted to create a calibration curve. Next, the absorbance of the labeled polypeptide solution is measured in the same manner as in the dye solution. Then, the dye concentration of the labeled polypeptide solution is determined from the absorbance value of the solution using the calibration curve.

The polypeptide concentration of the labeled polypeptide solution is measured as follows. First, a calibration curve based on the polypeptide concentration of the polypeptide solution and its absorbance is created. Specifically, solutions containing the polypeptide itself at various concentrations are prepared, and the polypeptide concentration of each solution is measured using Pierce (trademark) 660 nm Protein Assay Kit (Thermo Fisher Scientific). Specifically, first, the reagent for protein quantification contained in the kit is mixed with a polypeptide solution, and the absorbance of the mixed solution at 660 nm is measured. Then, absorbance corresponding to each polypeptide concentration is plotted to create a calibration curve. Next, the absorbance of the labeled polypeptide solution is measured in the same manner as in the polypeptide solution. Then, the polypeptide concentration of the labeled polypeptide solution is determined from the absorbance value of the solution using the calibration curve.

As the molar absorption coefficient of the dye, a value obtained by the measurement can be used. Alternatively, a molar absorption coefficient disclosed by the manufacturer or seller of the dye may be used. The molar absorption coefficient ($M^{-1}$ $cm^{-1}$) of the dye can be calculated from the following formula (IV) using the measured values of the absorbance of the dye solution, and optical path length (cm) of a cell of the spectrophotometer, and the dye concentration (M). Preferably, molar absorption coefficients are calculated for a plurality of dye solutions with different dye concentrations, and an average value thereof is used as the molar absorption coefficient of the dye. The dye concentration of the dye solution is a molar concentration, and is calculated as follows. First, a predetermined amount of dye is accurately weighed by a precision scale or an electronic balance. Subsequently, the weighed dye is dissolved in a solvent to accurately prepare a solution in a predetermined amount. Then, the molar concentration is calculated from the weight of the weighed dye, the solution amount, and the molecular weight of the dye. The solvent used for preparing the dye solution is used for measuring the absorbance of a blank. The measurement of the absorbance of the dye solution is as described above.

[Expression 1]

$$\text{(Molar absorption coefficient of dye)} = \frac{\text{(Absorbance of dye solution)} - \text{(Absorbance of blank)}}{\text{(Molar concentration of dye solution)} \times \text{(Optical path length)}} \quad \text{(IV)}$$

The labeled polypeptide can be obtained by covalently bonding the polypeptide and the dye. For example, it is preferable to covalently bond the polypeptide and the dye using a functional group of each of the polypeptide and the dye. For example, a reaction using a condensing agent or a crosslinker is simple and preferable. Such reactions are known per se. Although the functional group is not particularly limited, an amino group, a carboxyl group and a sulfhydryl group are preferred because commercially available condensing agents and crosslinkers can be used.

The condensing agent is not particularly limited, and for example, when a polypeptide and a dye are covalently bonded to each other by an amidation reaction, examples thereof include 4-(4,6-dimethoxy-1,3,5-triazin-2-yl)-4-methylmorpholinium chloride (DMT-MM), 2-chloro-1,3-dimethylimidazolinium (DMC), 1H-benzotriazol-1-yloxytripyrrolidinophosphonium hexafluorophosphate, diphenylphosphoryl azide, chlorotripyrrolidinophosphonium hexafluorophosphate, N,N'-diisopropylcarbodiimide, and the like. Among them, DMT-MM, DMC and 1H-benzotriazol-1-yloxytripyrrolidinophosphonium hexafluorophosphate are preferable, and DMT-MM is particularly preferable. The amidation reaction by DMT-MM is as follows.

[Chemical Formula 1]

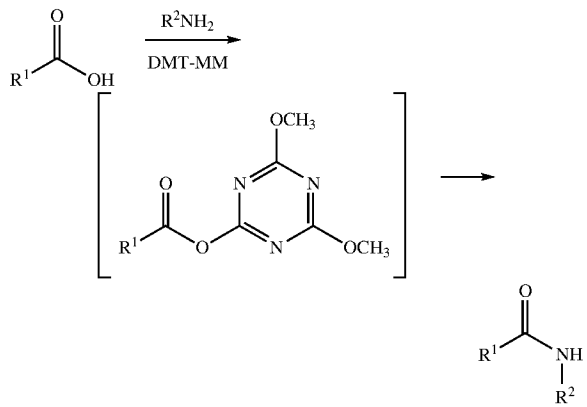

The crosslinker is not particularly limited, and can be appropriately selected according to the functional group of each of the polypeptide and the dye. For example, a compound having an amino group as a functional group can be bonded to an N-hydroxysuccinimide (NHS) ester or a compound having an isothiocyano group (see the lower diagram). For example, when a polypeptide having an amino group is bonded to a dye having an amino group, a divalent reagent having NHS esters at both ends can be used as a crosslinker.

[Chemical Formula 2]
Reaction Between NHS Ester and Amino Group

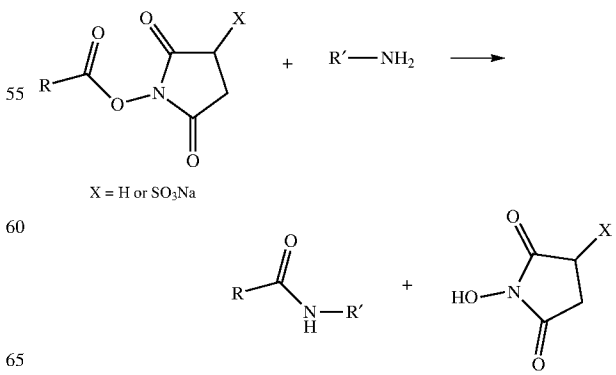

Reaction Between Isothiocyano Group and Amino Group

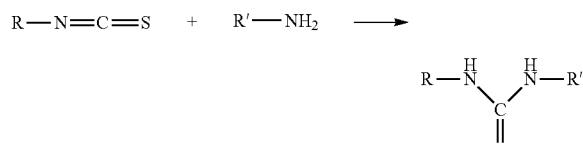

A compound having a carboxyl group as a functional group is first reacted with a compound having a carbodiimide group (—N=C=N—) (see the lower diagram). In this example, it is reacted with 1-ethyl-3-(3-dimethylaminopropyl) carbodiimide hydrochloride (first step). NHS is reacted with the reactant to form an unstable NHS ester (second step). By reacting a compound having an amino group with the unstable NHS ester, the compound can be bonded to a compound having a carboxyl group (third step). For example, when a dye (or polypeptide) having a carboxyl group is bonded to a polypeptide (or dye) having an amino group, they can be crosslinked in this manner. When a polypeptide having a carboxyl group and a dye having a carboxyl group are crosslinked, a divalent reagent having amino groups at both ends can be used.

[Chemical Formula 3]

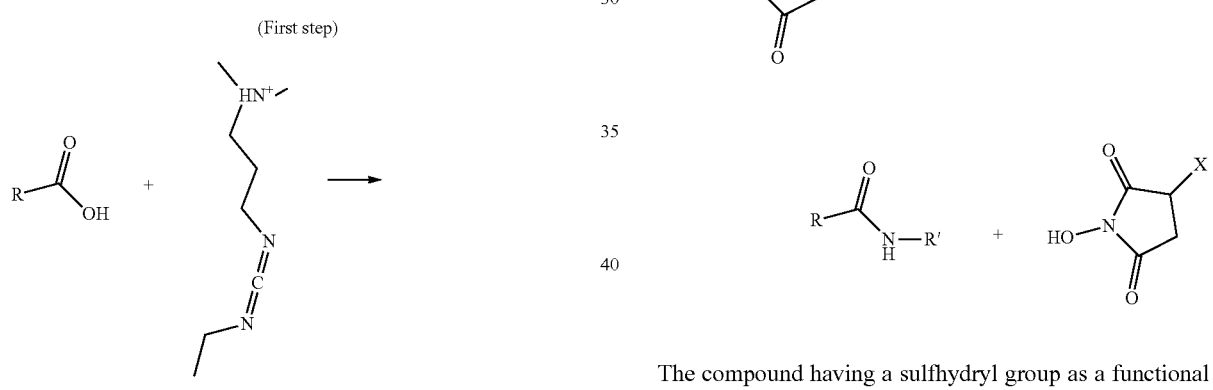

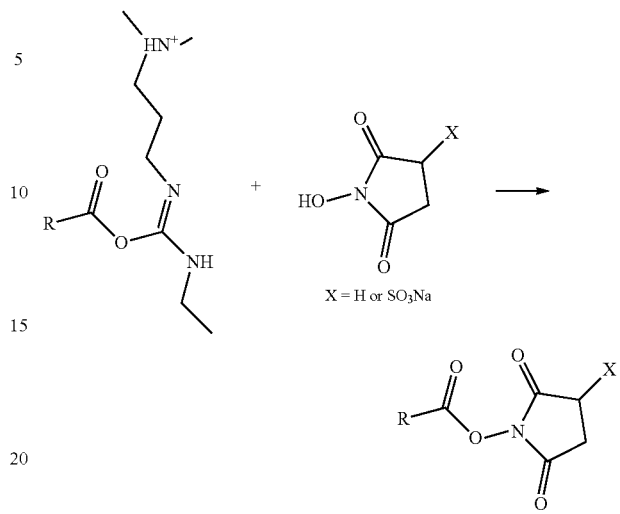

The compound having a sulfhydryl group as a functional group can be bonded to a compound having a maleimide group or a bromo (or iodo) acetamide group (see the lower drawing). For example, when a polypeptide having a sulfhydryl group is bonded to a dye having a sulfhydryl group, a bivalent reagent having maleimides at both ends can be used as a crosslinker. When a dye (or polypeptide) having a sulfhydryl group is bonded to a polypeptide (or dye) having an amino group, a heterobivalent reagent having maleimide and an NHS ester can be used as a crosslinker.

[Chemical Formula 4]

Reaction Between Maleimide Group and Sulfhydryl Group

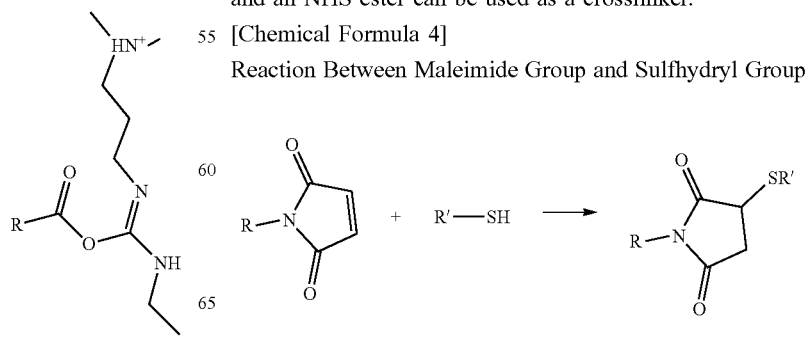

Reaction Between Bromo (Iodo) Acetamide Group and Sulfhydryl Group

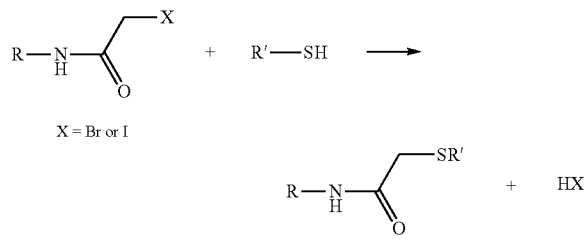

X = Br or I

In the labeled polypeptide, it is preferable that a plurality of molecules of dyes are bound to one molecule of polypeptide. Therefore, when the reaction for binding the polypeptide and the dye is performed, it is preferable to use a dye in a larger amount than the amount of the polypeptide. For example, the polypeptide and the dye may be reacted at a molar ratio of 1:2 to 100.

If necessary, the test soil of the present embodiment may contain components other than the labeled polypeptide. Examples of such components include lipids, carbohydrates, preservatives, antioxidants, pH adjusting agents, stabilizers, and the like. Examples of the lipid include glycerides, cholesterol esters, higher fatty acids, phospholipids, glycolipids, and the like. Examples of the carbohydrate include glucose, glycogen, dextran, starch, and the like. Examples of the preservative include sodium azide thimerosal, and the like. Examples of the antioxidant include ascorbic acid, butylhydroxyanisole, and the like. Examples of the pH adjusting agent include phosphoric acid, citric acid, succinic acid, and salts thereof, and the like. Examples of the stabilizer include polyethylene glycol, polyvinyl pyrrolidone, and the like.

The test soil of the present embodiment may be stored in a container, and the container may be packed in a box and provided to a user. The test soil may be in a solid state, such as a powder, or in a liquid state, such as a solution or suspension. The box may contain a package insert describing a method of using and a method of storing the test soil of the present embodiment, and the like. FIG. 1 shows an example of the test soil of the present embodiment. Referring to FIG. 1, 10 denotes a container containing the test soil of the present embodiment, 11 denotes a packing box, and 12 denotes a package insert.

A further embodiment relates to a method for cleaning an object using a test soil. Hereinafter, this method is also referred to as "the cleaning method of the present embodiment". In the cleaning method of the present embodiment, first, the test soil of the present embodiment is attached to an object. The object is not particularly limited as long as it is an instrument that can be reused by cleaning. Examples of such an instrument include medical instruments, tableware, cooking instruments, and the like. Among them, medical instruments are preferable, and instruments that come into contact with the patient's body or biological samples are particularly preferable. Examples of the medical instrument include surgical knives, forceps, scissors, tubes, catheters, syringes, endoscopes, and the like. The medical instrument is not limited to an instrument directly used by a doctor or the like, and includes, for example, a medical instrument used for a surgery support robot. The medical instrument may be an electronic device as long as it can be cleaned. The number of the objects may be one or more.

In the cleaning method of the present embodiment, the test soil is preferably used as a solution or suspension. The concentration of the labeled polypeptide in the solution or suspension is not particularly limited. For example, the solution or suspension of the test soil of the present embodiment may contain, for example, 0.1 µg/mL or more, 1 µg/mL or more, 10 µg/mL or more, 0.1 mg/mL or more, or 0.5 mg/mL or more of the labeled polypeptide in terms of the concentration of the polypeptide. The solution or suspension of the test soil of the present embodiment may contain, for example, 300 mg/mL or less, 100 mg/mL or less, 50 mg/mL or less, 15 mg/mL or less, or 5 mg/mL or less of the labeled polypeptide in terms of the concentration of the polypeptide. The medium is not particularly limited as long as the labeled polypeptide can be dissolved or dispersed, but is preferably an aqueous medium. Examples of the aqueous medium include water, physiological saline solutions, buffer solutions, and the like. The buffer solution preferably has a buffering action at a pH of 6 or more and 8 or less, and examples thereof include phosphate buffered saline (PBS), Tris-HCl, Good's buffers (HEPES, MOPS, and the like are exemplified), and the like.

The attachment of the test soil to the object can be carried out, for example, by methods such as applying, spraying, dropping or printing a solution or suspension of the test soil on the object or immersing the object in the solution or suspension of the test soil. After attaching the solution or suspension of the test soil, it is preferable to dry the object to which the solution or suspension is attached by air drying, warm air, or the like. The site to which the test soil is attached in the object is not particularly limited. Such a site can be selected from sites to which actual contaminant may attach, such as, for example, an outer surface, an inner surface, a lumen, or the like of the object. In one object, the number of sites to which the test soil is attached may be one or two or more. The amount of the attached test soil is not particularly limited, and for example, the test soil of the present embodiment is attached to the object at a ratio of, for example, 2 µg or more, 10 µg or more, 50 µg or more, 200 µg or more, 500 µg or more, 1000 µg or more, 1500 µg or more, or 1800 µg or more per 1 $cm^2$ of the object in terms of polypeptide concentration. In the field of medical instrument cleaning, the amount of protein remaining after cleaning is required to be less than 2 $µg/cm^2$.

Next, in the cleaning method of the present embodiment, the object to which the test soil is attached is cleaned. The means of cleaning is not particularly limited, and can be appropriately determined according to the object. Examples thereof include hand cleaning, ultrasonic cleaning, cleaning with a washer disinfector (WD), and the like. The hand cleaning includes operations such as immersion in water or a detergent solution, brushing, and rinsing. The ultrasonic cleaning is performed by irradiating an object with ultrasonic waves while the object is immersed in water or a detergent solution. It is preferable to use a commercially available ultrasonic cleaning device. In the cleaning by WD, water or a detergent solution is sprayed to an object disposed in commercially available WD to clean the object. The temperature of water is not particularly limited, and is usually 10° C. or more and less than 100° C., and preferably 40° C. or more and 90° C. or less. The detergent is not particularly limited, and can be appropriately selected from known detergents according to the object and the means of cleaning. Examples thereof include alkaline detergents, neutral detergents, and the like. The detergent may contain enzymes such as protease, lipase, and amylase. The concentration of the detergent solution is not particularly limited, and can be appropriately determined according to the type of the detergent and the means of cleaning. For example, when the object is immersed in the detergent solution and cleaned, the detergent concentration of the solution is usually 0.5 wt % or more and 1 wt % or less.

In the cleaning method of the present embodiment, the test soil remaining on the cleaned object can be an index of whether or not the cleaning operation was appropriate. For example, when the test soil of the present embodiment does not remain in the cleaned object, it is suggested that the cleaning operation on the object was appropriate. When the test soil of the present embodiment remains in the cleaned object, it is suggested that the cleaning operation on the object was not appropriate. The degree of inappropriateness of the cleaning operation may be evaluated based on the amount of test soil remaining in the object.

Whether or not the test soil of the present embodiment remains in the cleaned object can be visually confirmed. For example, in the case of using a test soil containing a labeled polypeptide to which a red dye is bound, when the cleaning operation was not appropriate, a red attached substance can be confirmed on the object by visual observation under white light. When the cleaning operation was appropriate, even if the object is visually observed under white light, a red attached substance is not confirmed on the object. In the case of using a test soil containing a labeled polypeptide to which a fluorescent dye is bound, when the cleaning operation was not appropriate, an attached substance of fluorescent color can be confirmed on the object by visual observation under irradiation with excitation light. When the cleaning operation was appropriate, even when the object is visually observed under the irradiation of the excitation light, an attached substance of fluorescent color is not confirmed on the object.

A further embodiment relates to a method for controlling accuracy of cleaning operation using the test soil of the present embodiment. Hereinafter, this method is also referred to as "the accuracy control method of the present embodiment". In the accuracy control method of the present embodiment, first, the test soil of the present embodiment is attached to an object. Next, the object to which the test soil is attached is cleaned. Details of the attachment of the test soil and cleaning of the object are the same as those described for the cleaning method of the present embodiment.

In the accuracy control method of the present embodiment, the test soil remaining on the cleaned object is evaluated based on the dye of the labeled polypeptide contained in the test soil. For example, whether or not the test soil remains in the cleaned object can be evaluated based on whether or not the dye can be visually confirmed. Specifically, in a case where the dye of the labeled polypeptide was observed when the cleaned object was visually observed, it can be evaluated that the test soil remains in the object. In this case, it can be determined that the cleaning operation on the object was not appropriate. On the other hand, in a case where the dye of the labeled polypeptide was not observed when the cleaned object was visually observed, it can be evaluated that the test soil was removed from the object. In this case, it can be determined that the cleaning operation on the object was appropriate.

For example, in the case of using a test soil containing a labeled polypeptide to which a red dye is bound, when a cleaned object was visually observed under white light and a red attached substance was observed, it can be evaluated that the test soil remained. When the cleaned object was visually observed under white light and no red attached substance was observed, it can be evaluated that the test soil was removed. In a case of using a test soil containing a labeled polypeptide to which a fluorescent dye is bound, when the cleaned object was irradiated with excitation light and an attached substance of fluorescent color was observed by visual observation, it can be evaluated that the test soil remained. When the object to be cleaned was irradiated with excitation light and no attached substance of fluorescent color was observed by visual observation, it can be evaluated that the test soil was removed.

In the accuracy control method of the present embodiment, an object to which a test soil is attached may be cleaned, and another object to which a biologically derived contaminant is attached may be similarly cleaned. Therefore, a further embodiment relates to a method for controlling accuracy of cleaning operation by cleaning a first object to which a test soil is attached and a second object to which a biologically derived contaminant is attached. Hereinafter, this method is also referred to as "the accuracy control method of the further embodiment".

In the accuracy control method of the further embodiment, first, a test soil is attached to a first object. The first object is an object to which a test soil is to be attached. The type of the object itself is the same as the object in the cleaning method of the present embodiment. The first object is preferably a medical instrument, and more preferably an unused or cleaned medical instrument. Details of the attachment of the test soil to the first object are the same as those described for the cleaning method of the present embodiment.

The second object is an object separate from the first object, and is an object to which a biologically derived contaminant is attached by use. The type of the object itself is the same as the object in the cleaning method of the present embodiment. A preferred second object is a post-use and uncleaned medical instrument. The second object may be an instrument of the same type as the first object, or may be an instrument of a different type from the first object.

The biologically derived contaminant is not particularly limited as long as it is a substance that attaches to the second object by using the second object in a living body. Examples of such a contaminant include body fluids, skin fragments, fat fragments, cells, tissue fragments, bone fragments, sputum, vomit, urine, feces, and the like. Examples of the body fluid include blood, lymph fluid, cerebrospinal fluid, saliva, digestive fluid, ascites, nasal discharge, pus, and the like. The biologically derived contaminant attached to the second object may be in a state of containing moisture or in a dry state. The biologically derived contaminant is not limited to one kind, and two or more kinds of contaminants and mixtures thereof can be attached.

In the accuracy control method of the further embodiment, a first object to which a test soil is attached and a second object to which a biologically derived contaminant is attached are cleaned. Details of the cleaning means are the same as those described for the cleaning method of the present embodiment. In the cleaning in the accuracy control method of the further embodiment, the first object and the second object may be cleaned together. For example, when cleaning is performed by immersion in a detergent solution, the first object and the second object can be cleaned together by putting the first object and the second object into one cleaning tank in which the detergent solution is stored. When cleaning is performed by ultrasonic cleaning or WD, the first object and the second object can be cleaned together by putting the first object and the second object into one ultrasonic cleaning device or WD.

Alternatively, in the cleaning in the accuracy control method of the further embodiment, the first object and the second object may be cleaned separately, substantially simultaneously or sequentially as long as the means and conditions of cleaning are the same. For example, in the case of hand cleaning, brushing and rinsing may be performed on the first object, and then brushing and rinsing may be performed on the second object in the same manner. When a plurality of persons perform hand cleaning, one person may perform brushing and rinsing on the first object, and another person may perform brushing and rinsing on the second object in the same manner. When cleaning is performed by ultrasonic cleaning or WD, first, the first object is cleaned by ultrasonic cleaning or WD. Thereafter, the setting of the device and the arrangement place of the second object are made the same as the cleaning of the first object, and the second object is cleaned by ultrasonic cleaning or WD. Two ultrasonic cleaning devices or WDs may be used to clean the first object and the second object separately and substantially simultaneously with the same device settings.

In the accuracy control method of the further embodiment, the test soil remaining on the cleaned first object is evaluated based on the dye. In the accuracy control method, since the first object to which the test soil is attached and the second object to which the biologically derived contaminant is attached are similarly cleaned, the test soil remaining on the cleaned first object is an index of the accuracy of the cleaning operation on the second object. Details of the evaluation of the remaining test soil based on the dye are the same as those described for the accuracy control method of the present embodiment.

For example, when a dye of the labeled polypeptide was observed when the cleaned first object was visually observed, it can be evaluated that the test soil remains in the first object. In this case, since it can be determined that the cleaning operation on the first object was not appropriate, it is determined that the cleaning operation on the second object similarly cleaned was not also appropriate. On the other hand, when the dye of the labeled polypeptide was not observed when the cleaned first object is visually observed, it can be evaluated that the test soil was removed from the first object. In this case, since it can be determined that the cleaning operation on the first object was appropriate, it is determined that the cleaning operation on the second object similarly cleaned was also appropriate.

The residual amount of the test soil in the cleaned first object may be quantified based on the dye. For example, all test soils remaining on the cleaned first object are stripped off and dissolved or suspended in a predetermined amount of aqueous solvent. The dye in the obtained solution or suspension is measured, for example, with a spectrophotometer. Then, the dye concentration in the solution or suspension is calculated based on the measured value of the absorbance. The value of the dye concentration can be used as the residual amount of the test soil.

In the accuracy control method of the further embodiment, whether or not the cleaning operation on the second object was appropriate may be evaluated based on the residual amount of the test soil in the cleaned first object. For example, when the residual amount of the test soil in the first object was evaluated to be equal to or more than the predetermined value, it can be determined that the cleaning operation on the second object was not appropriate. When it was evaluated that the residual amount of the test soil in the first object is less than the predetermined value or the test soil does not remain, it can be determined that the cleaning operation on the second object was appropriate. The predetermined value is not particularly limited, and may be appropriately determined according to the types of the first and second objects.

When it was determined that the cleaning operation on the second object is appropriate, the second object after cleaning is reusable. When it was determined that the cleaning operation on the second object is not appropriate, the second object after cleaning is preferably not reused. It is preferable to clean the second object again by making the cleaning operation more appropriate.

Hereinbelow, the present invention will be described in detail by examples, but the present invention is not limited to these examples.

EXAMPLES

Example 1: Preparation and Evaluation of Test Soil

EB-labeled BSA was prepared by binding erythrosine B (EB) and bovine serum albumin (BSA) using various condensing agents. In order to examine which condensing agent should be used, the absorbance (530 nm) of EB-labeled BSA and the number of EBs of one molecule of EB-labeled BSA were measured. The prepared EB-labeled BSA was applied to an object to evaluate whether or not it could be used as a test soil.

1. Preparation of EB-Labeled BSA

EB (Tokyo Chemical Industry Co., Ltd.) was dissolved in PBS to obtain an EB solution. Each of condensing agents 1 to 9 shown in Table 1 was dissolved in dimethyl sulfoxide (DMSO) to obtain a solution of each condensing agent. BSA was dissolved in PBS to obtain a BSA solution. The EB solution and the condensing agent solution were mixed at a molar ratio of 1:1.5, and the mixture was allowed to stand at room temperature for 10 minutes. Then, the solution containing EB and the condensing agent and the BSA solution were mixed at a molar ratio of 100:1, and the mixture was allowed to stand at room temperature for 1 hour. As a result, a solution containing EB-labeled BSA in which EB and BSA were covalently bonded was obtained. For comparison, the EB solution and the BSA solution were mixed without using the condensing agent solution to obtain a solution containing a complex of EB and BSA by physical adsorption (hereinafter, also referred to as a control). Each obtained solution was purified through a desalting column. A part of each solution was fractionated, and the BSA concentration of each solution was determined by absorbance measurement at 660 nm using Pierce (trademark) 660 nm Protein Assay Kit (Thermo Fisher Scientific). The condensing agents 1, 4, and 7 were purchased from Tokyo Chemical Industry Co., Ltd., and the condensing agents 2, 3, 5, 6, 8, and 9 were purchased from FUJIFILM Wako Pure Chemical Corporation.

TABLE 1

Condensing agent 1: DMT-MM
Condensing agent 2: 2-Chloro-1,3-dimethylimidazolinium
Condensing agent 3: 1H-Benzotriazol-1-yloxytripyrrolidinophosphonium hexafluorophosphate
Condensing agent 4: Diphenylphosphoryl azide
Condensing agent 5: Chlorotripyrrolidinophosphonium hexafluorophosphate
Condensing agent 6: N,N'-Diisopropylcarbodiimide
Condensing agent 7: 3H-1,2,3-Triazolo[4,5-b]pyridin-3-ol
Condensing agent 8: 1-Hydroxybenzotriazole
Condensing agent 9: N,N'-Carbonyldiimidazole

2. Evaluation of Number of EBs of EB-Labeled BSA

(2.1) Measurement of Absorbance (530 nm) of EB-Labeled BSA

Figure 2:
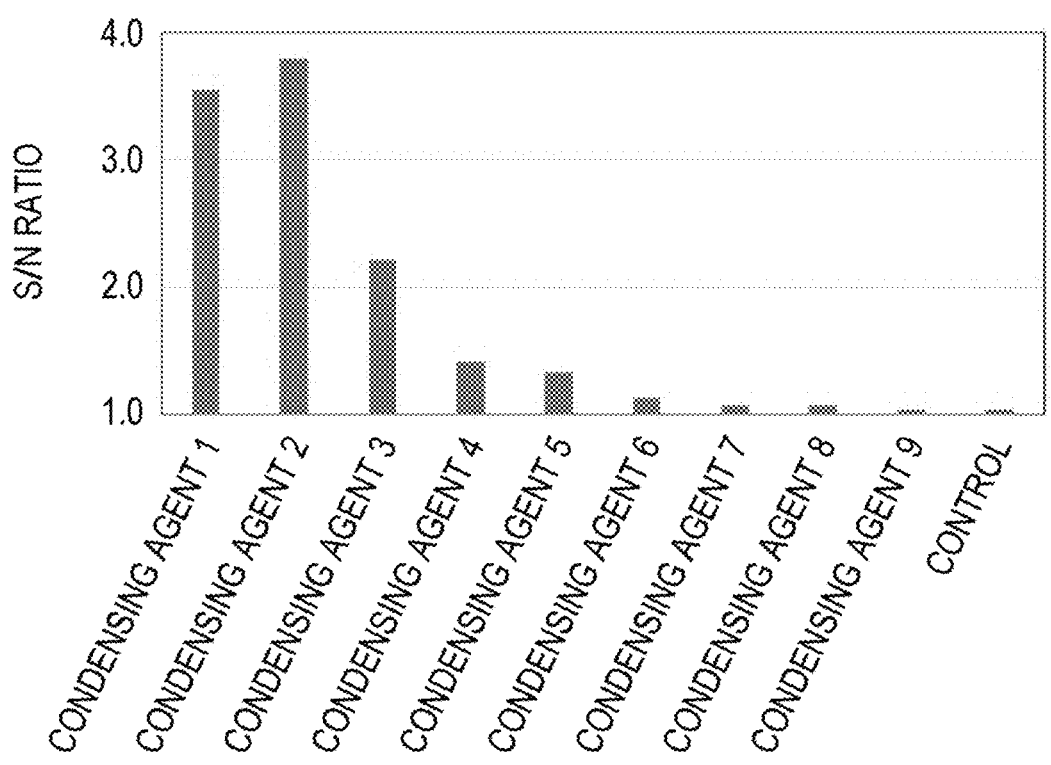
FIG. 2 is a graph showing S/N ratios calculated from values(S) of absorbance (530 nm) of erythrosine B (EB)-labeled albumin solutions and a value (N) of absorbance of phosphate buffered saline (PBS) as a blank.

The BSA concentration of each EB-labeled BSA solution was adjusted with PBS to 1.6 µg/mL. A part of these solutions was taken, and the absorbance at 530 nm was measured with a spectrophotometer. With the absorbance of the EB-labeled BSA solutions prepared using the condensing agents 1 to 9 as a signal value(S) and the absorbance of PBS as a blank as a noise value (N), the S/N ratio of each solution was calculated. The results are shown in FIG. 2.

(2.2) Determination of Number of EBs of EB-Labeled BSA by MALDI-TOF MS

Acetonitrile and trifluoroacetic acid were mixed with ultrapure water to prepare a solution containing 30% acetonitrile and 0.10% trifluoroacetic acid (hereinafter, referred to as a TA30 solution). The TA30 solution (0.10 mL) was added to sinapinic acid (1.0 mg), and sonication was performed for 10 minutes. The obtained solution was centrifuged, and the collected supernatant was used as a matrix. 10 µL of the solution of EB-labeled BSA in the above (2.1) was diluted 2 times with a 0.20% trifluoroacetic acid aqueous solution. ZipTip U-C18 (Merck Millipore) was attached to a micropipettor, and a resin at the tip was cleaned with a TA30 solution (10 µL). Then, a solution of EB-labeled BSA was adsorbed to the cleaned resin. The matrix (3.0 µL) was absorbed, and EB-labeled BSA was eluted onto a MALDI plate (Bruker). After the sample was dried on the plate, the mass per molecule of each EB-labeled BSA was measured using Ultraflex MALDI-TOF MS (Bruker). For comparison, the same measurement was performed using a solution containing a control. From the acquired mass of the EB-labeled BSA, mass of BSA (66463 Da), and molecular weight of EB (879.86), the number of EBs (hereinafter, also referred to as the number of EB labels) of one molecule of the EB-labeled polypeptide was calculated from the following formula. The results are shown in Table 2. In Table 2, the EB-labeled BSA was shown as the condensing agent used for the preparation. In the control, since EB and BSA were not covalently bound, EB and BSA were dissociated in MALDI-TOF MS measurement, and the number of EB labels was 0.

(Number of EB labels)=[(Mass of acquired EB-labeled BSA)−(Mass of BSA)]/(Molecular weight of EB)

TABLE 2

| EB-labeled BSA | Number of EB labels |
| --- | --- |
| Condensing agent 1 | 24.9 |
| Condensing agent 2 | 17.3 |
| Condensing agent 3 | 15.0 |
| Condensing agent 4 | 3.1 |
| Condensing agent 5 | 2.9 |
| Condensing agent 6 | 1.4 |
| Condensing agent 7 | 0.2 |
| Condensing agent 8 | 0.1 |
| Condensing agent 9 | 0.1 |
| Control | 0.0 |

(2.3) Results

Figure 3:
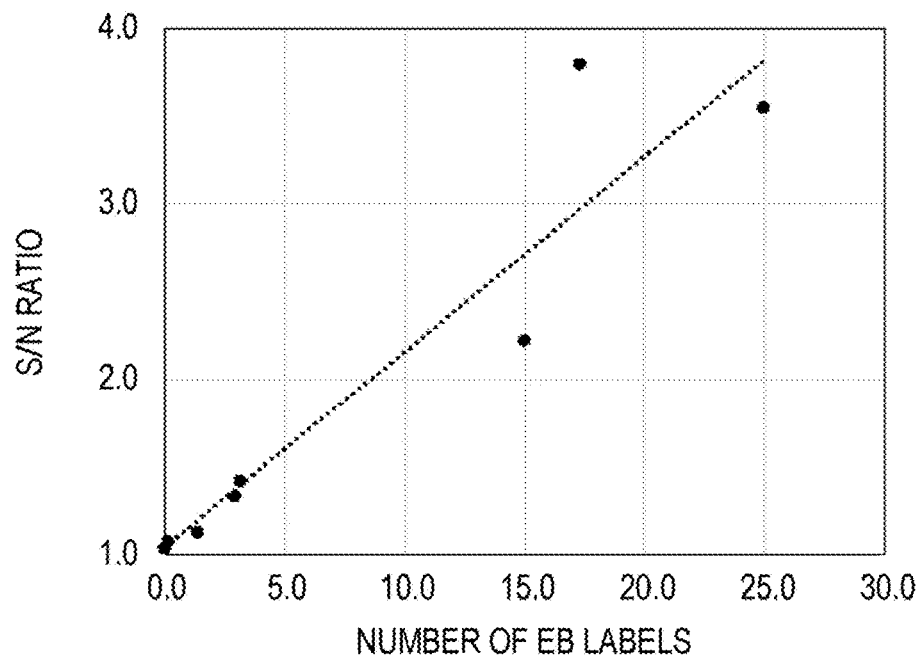
FIG. 3 is a graph showing a correlation between the number of EBs contained in one molecule of EB-labeled albumin and the S/N ratio of absorbance.

As shown in FIG. 2, in the EB-labeled BSA prepared using the condensing agents 1 and 2, the S/N ratio was remarkably high. A relatively good S/N ratio was observed in the EB-labeled BSA prepared using the condensing agents 3 to 5. Since 530 nm is the peak of the absorption wavelength of the EB aqueous solution, a high S/N ratio of the absorbance at 530 nm suggests that the number of EBs bound to BSA is large. Referring to Table 2, it was shown that in the EB-labeled BSA prepared using the condensing agents 1 to 6, at least one molecule of EB was bound to one molecule of the BSA. In particular, when the condensing agents 1 to 3 were used, the number of EB labels was remarkably large. A correlation between the number of EB labels and the S/N ratio of absorbance at 530 nm was examined. The results are shown in FIG. 3. As can be seen from FIG. 3, it was shown that the larger the number of EB labels, the higher the S/N ratio of absorbance.

3. Use of EB-Labeled BSA as Test Soil

Figure 4:
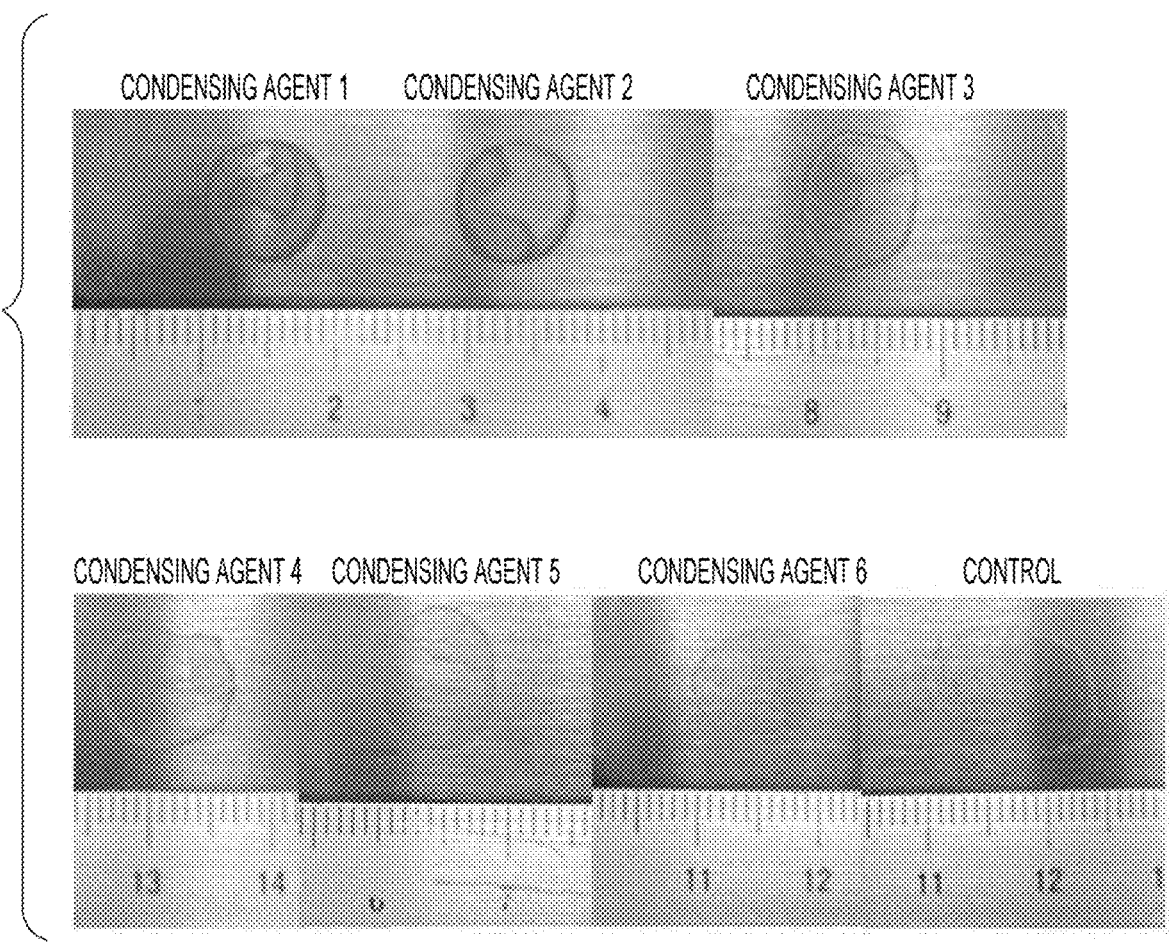
FIG. 4 shows photographs of plates made of stainless steel coated with EB-labeled albumin.

EB-labeled BSA solutions prepared using the condensing agents 1 to 6 and a control solution were each applied to the surface (about 1 cm$^2$) of a plate made of stainless steel (hereinafter, referred to as a stainless steel plate) in an amount of 2 µg/cm$^2$ (based on BSA concentration), and dried. In the field of medical instrument cleaning, since the amount of remaining protein is required to be less than 2 µg/cm$^2$, the stainless steel plate coated with the EB-labeled BSA simulates a medical instrument after cleaning. Photographs of the stainless steel plates coated with each EB-labeled BSA are shown in FIG. 4. In FIG. 4, the EB-labeled BSA was shown as the condensing agent used for the preparation. Referring to FIG. 4, the presence of EB-labeled BSA prepared using the condensing agents 1 to 6 could be visually confirmed. In particular, in EB-labeled BSA prepared using the condensing agents 1 to 3, red attached substances derived from EB could be clearly confirmed. On the other hand, in the control, it was difficult to visually confirm the presence.

4. Determination of Index Characterizing Test Soil

It was examined to evaluate performance of the EB-labeled BSA as a test soil with an index based on the EB-labeled BSA itself rather than the type of the condensing agent used in the preparation. The present inventors considered that visibility of a test soil correlates with the molar absorption coefficient of EB and the number of EB labels. Therefore, a color tone index based on the molar absorption coefficient of EB and the number of EB labels was determined.

(4.1) Determination of Molar Absorption Coefficient of EB 660.0 mg of EB (molecular weight: 879.86) was accurately weighed, and dissolved in ultrapure water so as to be exactly 50 mL. The obtained EB aqueous solution (15 mM) was diluted with ultrapure water to prepare 37.5 µM, 18.75 µM, and 9.375 µM EB aqueous solutions. The absorbance at 530 nm of respective concentrations of the EB aqueous solutions and ultrapure water (EB concentration: 0 µM) as a blank was measured with a spectrophotometer. Optical path length of the cell of the spectrophotometer was 1 cm. Using the values of absorbance, optical path length (cm), and EB concentration (µM), the molar absorption coefficient (M$^{-1}$ cm$^{-1}$) was calculated from the following formula. The results are shown in Table 3.

(Molar absorption coefficient of EB)=[(Absorbance of aqueous EB solution)−(Absorbance of blank)]/[(EB Concentration)×10$^{-6}$×1]

TABLE 3

| EB concentration (µM) | 530 nm Abs | Molar absorption coefficient |
| --- | --- | --- |
| 37.5 | 2.8530 | 75895 |
| 18.75 | 1.4603 | 77524 |
| 9.375 | 0.7221 | 76319 |
| 0 | 0.0065 | — |

The average value of the molar absorption coefficients of 37.5 µM, 18.75 µM, and 9.375 µM aqueous EB solutions was calculated. The average value was 76579. Hereinafter, this average value was used as the molar absorption coefficient of EB.

(4.2) Calculation of Color Tone Index (CTI) of EB-Labeled BSA

The CTI of the EB-labeled BSA prepared using the condensing agents 1 to 6 was calculated from the following formula using the number of EB labels determined in the above (2.2) and the value of the molar absorption coefficient of EB determined in the above (4.1). The data obtained so far including CTI for each EB-labeled BSA is shown in Table 4. In the table, "−" in the item of visual determination indicates that it was difficult to visually confirm the presence of the EB-labeled BSA on the stainless steel plate, "+" indicates that it was possible to visually confirm the presence of the EB-labeled BSA on the stainless steel plate, and "++" indicates that it was possible to visually confirm the presence of the EB-labeled BSA on the stainless steel plate in a shorter time than in the case of "+" or in an instant.

(CTI)=(Number of EBs contained in one molecule of EB-labeled polypeptide)×(Molar absorption coefficient of EB)

TABLE 4

| Dye | Poly-peptide | Condensing agent | Number of EB labels | S/N ratio of absorbance (530 nm, 1.6 µg/mL) | CTI | Visual determination (2 µg/cm$^2$) |
|---|---|---|---|---|---|---|
| EB | BSA | Condensing agent 1 | 24.9 | 3.60 | 1,906,817 | ++ |
| | | Condensing agent 2 | 17.3 | 3.80 | 1,324,816 | ++ |
| | | Condensing agent 3 | 15.0 | 2.22 | 1,148,685 | ++ |
| | | Condensing agent 4 | 3.1 | 1.42 | 237,394 | + |
| | | Condensing agent 5 | 2.9 | 1.33 | 222,079 | + |
| | | Condensing agent 6 | 1.4 | 1.13 | 107,210 | + |
| | | None | 0.0 | 1.04 | 0 | − |

From Table 4, it was shown that EB-labeled BSA with a CTI value of 100,000 or more can be used as a test soil. In particular, EB-labeled BSA with a CTI value of 1,000,000 or more was shown to be a test soil with excellent visibility.

Example 2: Preparation and Evaluation of Test Soil (2)

Using casein as a polypeptide, EB was covalently bonded by DMT-MM to prepare EB-labeled casein. The absorbance (530 nm) and the number of labels of EB-labeled casein were measured. The prepared EB-labeled casein was applied to an object to evaluate whether or not it could be used as a test soil.

1. Preparation of EB-Labeled Casein

An EB solution and a DMT-MM solution (10 mM) were obtained in the same manner as in Example 1. Casein (FUJIFILM Wako Pure Chemical Corporation) was dissolved in PBS to obtain a casein solution. The EB solution and the DMT-MM solution were mixed at the molar ratio (Conditions 1 to 6) shown in Table 5, and the mixture was allowed to stand at room temperature for 10 minutes. Then, the solution containing EB and the condensing agent and the casein solution were mixed at a molar ratio of 100:1, and the mixture was allowed to stand at room temperature for 1 hour. As a result, a solution containing EB-labeled casein in which EB and casein were covalently bonded was obtained. Each obtained solution was purified through a desalting column. A part of each solution was fractionated, and the absorbance at 660 nm was measured using Pierce (trademark) 660 nm Protein Assay Kit (Thermo Fisher Scientific) as a protein quantification reagent to determine the casein concentration of each solution. The calibration curve used for the determination of the concentration was created based on the dry weight of casein.

TABLE 5

| | Molar ratio EB/DMT-MM) |
|---|---|
| Condition 1 | 6.25 |
| Condition 2 | 1.56 |
| Condition 3 | 0.39 |
| Condition 4 | 0.10 |
| Condition 5 | 0.02 |
| Condition 6 | 0.006 |

Figure 5:
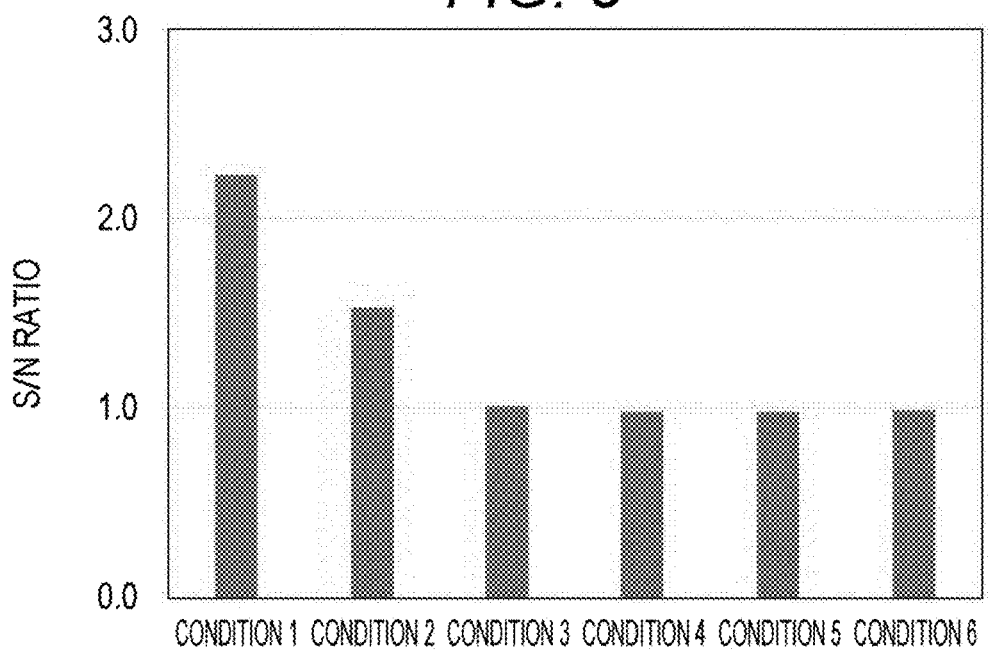
FIG. 5 is a graph showing S/N ratios calculated from values(S) of absorbance (530 nm) of EB-labeled casein solutions and a value (N) of absorbance of PBS.

2. Evaluation of Number of EBs of EB-Labeled Casein (2.1) Measurement of Absorbance (530 nm) of EB-Labeled Casein For the EB-labeled casein solution (casein concentration 1.6 µg/mL), the absorbance at 530 nm was measured with a spectrophotometer. With the absorbance of the solution containing the EB-labeled casein prepared under Conditions 1 to 6 as a signal value(S) and the absorbance of PBS as a blank as a noise value (N), the S/N ratio of each solution was calculated. The results are shown in FIG. 5.

(2.2) Determination of Number of EBs of One Molecule of EB-Labeled Casein

The EB-labeled casein was difficult to measure by MALDI-TOF MS. Therefore, the number of EB labels was calculated from the EB concentration and the casein concentration of the EB-labeled casein solutions prepared under Conditions 1 to 6. Specifically, the number of EB labels was calculated as follows. First, the EB solution was diluted with PBS to prepare dilution series of EB solutions containing EB at various concentrations. The absorbance (530 nm) of the dilution series was measured, and the absorbance corresponding to each EB concentration was plotted to create a calibration curve. Using the calibration curve, the EB concentration of the EB-labeled casein solutions prepared under Conditions 1 to 6 was determined from the signal value(S) acquired in the above (2.1). The value of EB concentration of each solution was divided by the value of casein concentration (1.6 µg/mL). The obtained value was defined as the number of EB labels of EB-labeled casein. Using the number of EB labels and the molar absorption coefficient of EB, the CTI of the EB-labeled casein was calculated from the formula in Example 1. The results are shown in Table 6. In Table 6, the EB-labeled casein was shown as the condition used for the preparation.

TABLE 6

| EB-labeled casein | Number of EB labels | CTI |
|---|---|---|
| Condition 1 | 9.5 | 727,500 |
| Condition 2 | 4.7 | 359,921 |
| Condition 3 | 0.2 | 15,316 |
| Condition 4 | 0.05 | 3,829 |
| Condition 5 | 0.015 | 1,149 |
| Condition 6 | 0.005 | 383 |

3. Use of EB-Labeled Casein as Test Soil

Figure 6:
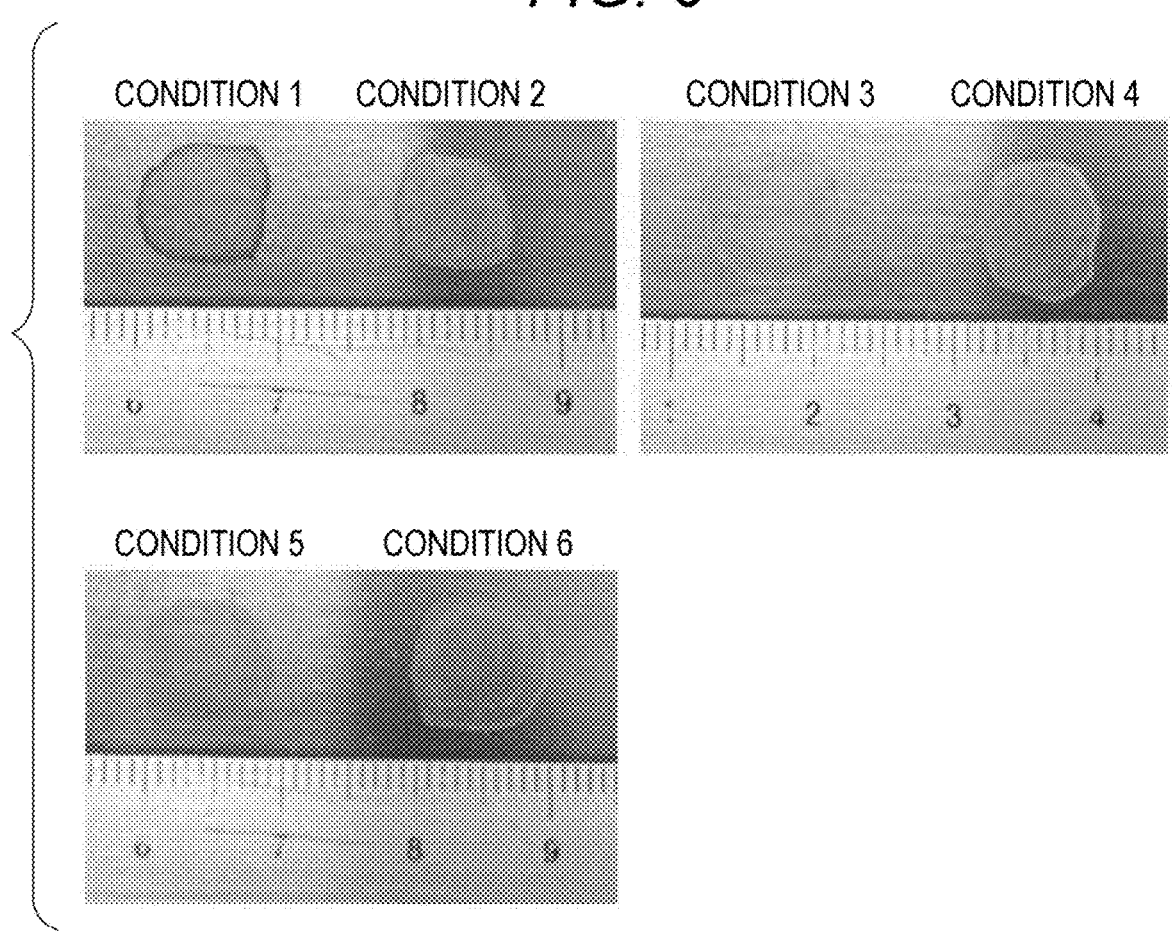
FIG. 6 shows photographs of plates made of stainless steel coated with EB-labeled casein.

The EB-labeled casein solutions prepared under Conditions 1 to 6 were each applied to the surface (about 1 cm$^2$) of a stainless steel plate in an amount of 2 µg/cm$^2$ (based on casein concentration), and dried. Photographs of the stainless steel plates coated with each EB-labeled casein are shown in FIG. 6. In the figure, the EB-labeled casein was shown as the condition used for the preparation. Referring to FIG. 6, in the EB-labeled casein prepared under Conditions 1 and 2, red attached substances derived from EB were visually clearly confirmed. On the other hand, the presence of the EB-labeled casein prepared under Conditions 3 to 6 was visually confirmed, but no EB-derived red was observed. For comparison, data for EB-labeled casein prepared under Conditions 1 to 4 is shown in Table 7. In the table, "−" in the item of visual determination indicates that it was difficult to visually confirm the presence of the EB-labeled casein on the stainless steel plate, and "+" indicates that it was possible to visually confirm the presence of the EB-labeled casein on the stainless steel plate.

TABLE 7

| Dye | Polypeptide | Condensing agent | Number of EB labels | S/N ratio of absorbance (530 nm, 1.6 µg/mL) | CTI | Visual determination (2 µg/cm$^2$) |
|---|---|---|---|---|---|---|
| EB | Casein | DMT-MM | 0.05 | 1.04 | 3,829 | − |
|  |  |  | 0.2 | 1.06 | 15,316 | − |
|  |  |  | 4.7 | 1.61 | 359,921 | + |
|  |  |  | 9.5 | 2.34 | 727,500 | + |

From Table 7, EB-labeled casein with a CTI value of 350,000 or more was shown to be a test soil having excellent visibility.

Example 3: Cleaning of Object to which Test Soil is Attached

The stainless steel plate to which the EB-labeled BSA as a test soil was attached was cleaned with ultrapure water or a detergent solution to evaluate whether or not the test soil remained.

1. Attachment and Cleaning of Test Soil to Object

EB-labeled BSA was prepared in the same manner as in Example 1 using DMT-MM as a condensing agent. A solution containing EB-labeled BSA (BSA concentration: 5 mg/mL) was applied to each of the two stainless steel plates in an amount of 500 µL, and air-dried. In order to reproduce insufficient cleaning, one stainless steel plate was immersed in ultrapure water (25° C.) for 10 minutes, and then the surface was cleaned with running water for 1 minute. In order to reproduce sufficient cleaning, the other stainless steel plate was immersed in an alkaline detergent (1 wt % sodium dodecyl sulfate (FUJIFILM Wako Pure Chemical Corporation) and 0.1 M sodium hydroxide (Kishida Chemical Co., Ltd.)) (25° C.) for 10 minutes, and then the surface was cleaned with running water for 1 minute. Whether or not the EB-labeled BSA remained on each stainless steel plate after cleaning was visually confirmed.

2. Evaluation of Cleanliness of Cleaned Stainless Steel Plate

Figure 7:
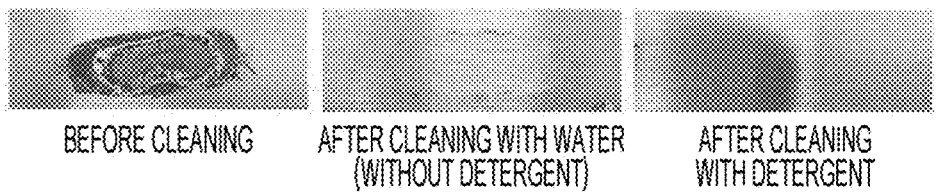
FIG. 7 shows photographs of plates made of stainless steel coated with EB-labeled albumin before and after cleaning.

Photographs of the stainless steel plates before cleaning and after cleaning are shown in FIG. 7. The left photograph of FIG. 7 showed that a sufficient amount of the test soil attached onto the stainless steel plate before cleaning. As can be seen from the central photograph of FIG. 7, when cleaning was performed only with water without using a detergent, red attached substances were observed on the stainless steel plate.

This showed that the EB-labeled BSA remained after cleaning. As can be seen from the right photograph of FIG. 7, no attached substance was observed on the stainless steel plate when cleaning was performed using a detergent. This showed that EB-labeled BSA did not remain after cleaning and was completely removed. As described above, it was shown that whether or not the cleaning operation on the object was appropriate can be evaluated by attaching the EB-labeled BSA as a test soil to the object, cleaning the object, and visually confirming whether the test soil remains in the object.

What is claimed is:

1. A method for cleaning an object, the method comprising:
    attaching a test soil to an object; and
    cleaning the object to which the test soil is attached,
    wherein the test soil comprises a plurality of molecules of labeled polypeptides,
    the labeled polypeptide is a polypeptide to which a dye is added by a covalent bond, and the value of X calculated by the following formula is 100,000 or more:

X=(Number of dyes comprised in one molecule of labeled polypeptide)×(Molar absorption coefficient of dye (M$^{-1}$ cm$^{-1}$)), the dye is erythrosine and the Molar absorption coefficient of the dye is a value measured at 530 nm, and
    the object is a medical instrument.

2. The test method claim 1, wherein the value of X is 350,000 or more.

3. The method according to claim 1, wherein the value of X is 1,000,000 or more.

4. The method according to claim 1, wherein the polypeptide is at least one protein selected from the group consisting of albumin, casein and fibrin or a fragment thereof.

5. The method according to claim 1, wherein the test soil remaining on the cleaned object is as an index of whether or not the cleaning was appropriate.

6. The method according to claim 1, wherein in the attaching, the test soil is attached to the object at a rate of at least 2 µg or more per 1 cm$^2$ in terms of polypeptide concentration.

7. A method for controlling accuracy of cleaning, the method comprising:
- attaching a test soil to an object;
- cleaning the object to which the test soil is attached;
- evaluating the test soil remaining on the cleaned object based on the dye; and
- determining whether or not the cleaning was appropriate based on the evaluation result, wherein the test soil comprises a plurality of molecules of labeled polypeptides, the labeled polypeptide is a polypeptide to which a dye is added by a covalent bond, and the value of X calculated by the following formula is 100,000 or more:

$$X = (\text{Number of dyes comprised in one molecule of labeled polypeptide}) \times (\text{Molar absorption coefficient of dye } (M^{-1}\ cm^{-1}))$$

the dye is erythrosine and the Molar absorption coefficient of the dye is a value measured at 530 nm, and the object is a medical instrument.

8. A method for controlling accuracy of cleaning, the method comprising:
- attaching a test soil to a first object;
- cleaning the first object to which the test soil is attached and a second object to which a biologically derived contaminant is attached;
- evaluating the test soil remaining on the cleaned first object based on the dye; and
- determining whether or not the cleaning on the second object was appropriate based on the evaluation result, wherein the test soil comprises a plurality of molecules of labeled polypeptides, the labeled polypeptide is a polypeptide to which a dye is added by a covalent bond, and the value of X calculated by the following formula is 100,000 or more:

$$X = (\text{Number of dyes comprised in one molecule of labeled polypeptide}) \times (\text{Molar absorption coefficient of dye } (M^{-1}\ cm^{-1})),$$

the dye is erythrosine and the Molar absorption coefficient of the dye is a value measured at 530 nm, and the first object is a medical instrument.

9. The method according to claim 8, wherein when it was evaluated in the evaluating step that the residual amount of the test soil in the first object was equal to or more than a predetermined value, it is determined in the determining step that the cleaning on the second object was not appropriate.

10. The method according to claim 8, wherein when it was evaluated in the evaluating step that the residual amount of the test soil in the first object was less than a predetermined value or the test soil did not remain, it is determined in the determining step that the cleaning on the second object was appropriate.

* * * * *